(12) United States Patent
Yu

(10) Patent No.: US 7,946,772 B2
(45) Date of Patent: May 24, 2011

(54) MONITORING CAMERA

(75) Inventor: Byung-uook Yu, Changwon (KR)

(73) Assignee: Samsung Techwin Co., Ltd., Changwon (KR)

(*) Notice: Subject to any disclaimer, the term of this patent is extended or adjusted under 35 U.S.C. 154(b) by 65 days.

(21) Appl. No.: 12/427,100

(22) Filed: Apr. 21, 2009

(65) Prior Publication Data

US 2010/0054725 A1 Mar. 4, 2010

(30) Foreign Application Priority Data

Aug. 29, 2008 (KR) .................. 10-2008-0085523

(51) Int. Cl.
 *G03B 17/02* (2006.01)
(52) U.S. Cl. ........................................ 396/427; 348/143
(58) Field of Classification Search .................. 396/427, 396/428; 348/143, 151, 158; 439/353–354, 439/358; 292/317; 403/322.3, 325, 338
See application file for complete search history.

(56) References Cited

U.S. PATENT DOCUMENTS

| | | | | |
|---|---|---|---|---|
| 3,185,835 A * | 5/1965 | Muller et al. | ................. | 362/324 |
| 3,590,241 A * | 6/1971 | Docimo et al. | ............... | 362/355 |
| 4,414,576 A * | 11/1983 | Randmae | ...................... | 348/373 |
| 4,880,261 A * | 11/1989 | Bisbing | ............................. | 292/7 |
| 6,093,044 A * | 7/2000 | Arbuckle | ...................... | 439/354 |
| 6,268,882 B1 * | 7/2001 | Elberbaum | ................... | 348/151 |
| 7,217,045 B2 * | 5/2007 | Jones | ........................... | 396/427 |
| 7,364,128 B2 * | 4/2008 | Donaldson et al. | ...... | 248/292.12 |

* cited by examiner

*Primary Examiner* — Clayton E LaBalle
*Assistant Examiner* — Leon W Rhodes
(74) *Attorney, Agent, or Firm* — Drinker Biddle & Reath LLP

(57) ABSTRACT

Provided is a monitoring camera including a base which is fixable and installable on a structure; a housing which is attachable to and detachable from the base; a hooking member which is disposed on the base so as to fix the housing with the base; a button member of which one end is exposed outside the housing and the other end is hinge-combinable with the housing in the housing; and a mounting unit which is fixedly attached to the hooking member so as to attach the housing to the base. The housing may be detached from the base by manipulating the button member which may detach the hooking member from the mounting unit.

14 Claims, 7 Drawing Sheets

MONITORING CAMERA

CROSS-REFERENCE TO RELATED PATENT APPLICATION

This application claims the benefit of Korean Patent Application No. 10-2008-0085523, filed on Aug. 29, 2008, in the Korean Intellectual Property Office, the entire contents of which is incorporated herein by reference.

BACKGROUND OF THE INVENTION

1. Field of the Invention

The present invention relates to a monitoring camera.

2. Description of the Related Art

Some monitoring cameras are installed inside or outside offices, houses, hospitals, banks, public buildings requiring security, etc. and are widely used to prevent crimes. Monitoring cameras may be installed in many locations, for example, at underground parking lots where crimes may occur, streets requiring control over illegal parking, or residential streets where various accidents frequently happen.

Many monitoring cameras may be categorized as a dome type, a set type, a bullet type, and a miniature type according to their installation. The dome type adopts a hemisphere shape as a basic design element, which is familiar in interior lighting devices. Thus, the dome type reduces aversion felt by people who are monitored and matches well with the designs of interiors.

Some dome-type monitoring cameras are installed by fixing and installing a base on a structure, such as a ceiling, and combining a housing to the base, for internal or external installment. Often the base and the housing are combined using screws. In some dome-type monitoring camera, a driver has to be used to fasten or unfasten the screws in order to combine or separate the base and the housing, and thus space for manipulating the driver is required. Accordingly, a monitoring camera cannot be easily installed where space is limited.

SUMMARY OF THE INVENTION

The present invention provides an easily attachable and detachable monitoring camera.

According to an embodiment of the present invention, there is provided a monitoring camera including a base which is fixable and installable on a structure; a housing which is attachable to and detachable from the base; a hooking member which is disposed on the base so as to fix the housing with the base; a button member of which one end is exposed outside the housing and the other end is hinge-combinable with the housing and is disposed in the housing; and at least one mounting unit which is fixedly attachable to the hooking member so as to attach the housing to the base, and is detachable from the hooking member due to a manipulation of the button member so as to detach the housing from the base.

In an embodiment, mounting unit may include an extension member of which one end is connected to the other end of the button member; and a latch which is connected to the other end of the extension member and is fixedly attachable to the hooking member.

In an embodiment, mounting unit may further include a fixing bracket which is disposed on the base and is hinge-combinable with the latch.

In an embodiment, mounting unit may further include an elastic member which is disposed on a hinge pin that hinge-combines the latch and the fixing bracket, and has elasticity so as to maintain the latch fixedly attached to the hooking member In an embodiment, the elastic member may be a torsion spring.

In an embodiment, the elastic member may include a coil unit, a first straight unit which extends from one end of the coil unit, and a second straight unit which extends from the other end of the coil unit, and the coil unit may fit around the hinge pin, the first straight unit may be fixed with the fixing bracket, and the second straight unit may be disposed on an upper portion of the latch.

In an embodiment, the hooking member may include a bottom unit which is disposed on the base; a pillar unit which extends from the bottom unit in a direction toward the housing; and a protrusion unit which protrudes from one end of the pillar unit in a direction toward a side of the housing.

In an embodiment, the latch may include a fixing indentation corresponding to the protrusion unit so as to engage with the protrusion unit.

In an embodiment, the protrusion unit may include a slope which is inclined toward the housing.

In an embodiment, the base may include an accommodating unit which provides a space where the hooking member is accommodated, and one side of the accommodating unit may be open so as to allow the latch to fixedly attach to the hooking member.

The monitoring camera may further include a bracket which is disposed between the housing and the base, and an accommodating indentation may be formed in a side of the bracket so as to correspond to the hooking member.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
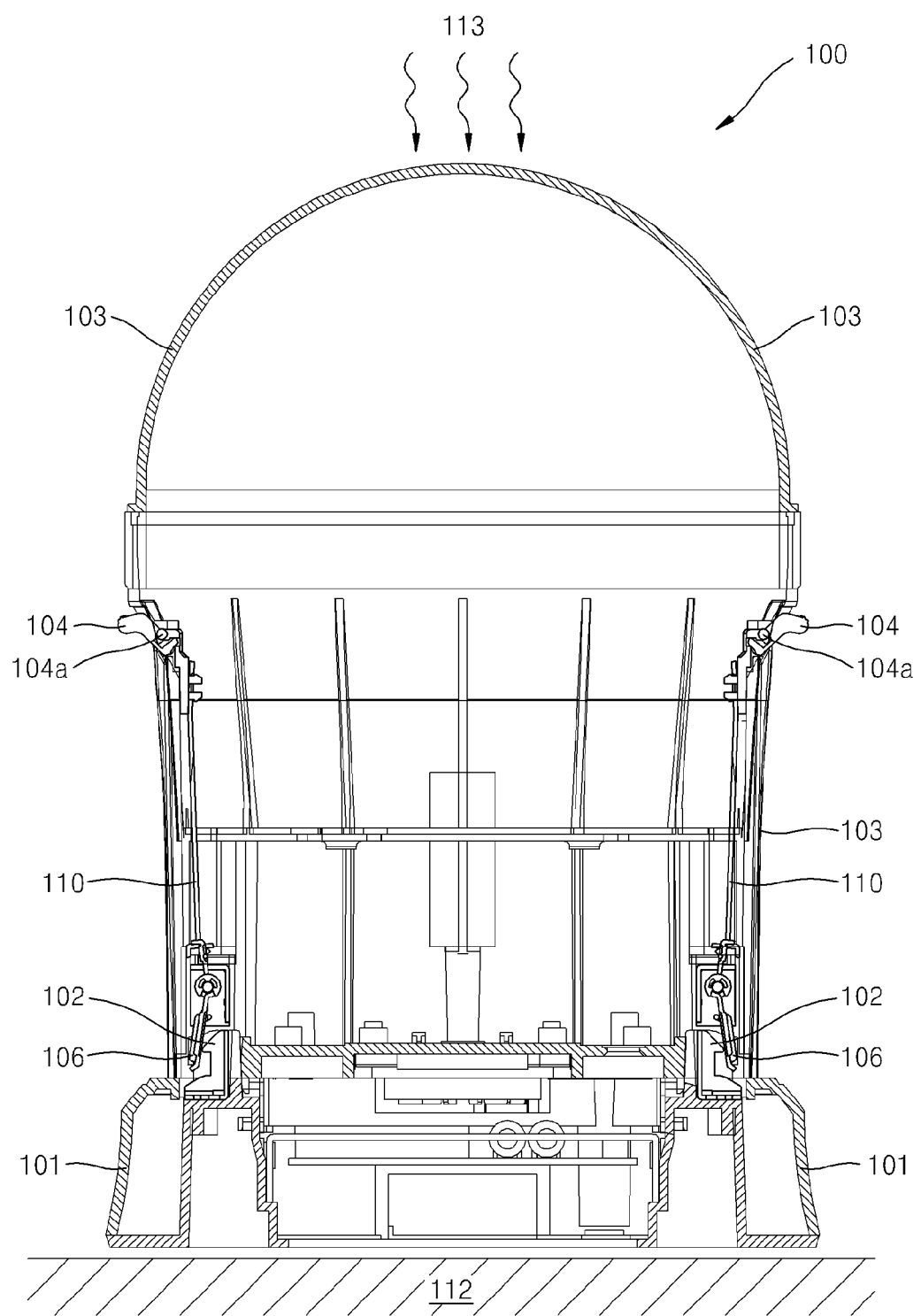
FIG. 1 is a cross-sectional view of an example of a monitoring camera according to an embodiment of the present invention.

Hereinafter, the present invention will be described in detail by explaining embodiments of the invention with reference to the attached drawings. The invention may, however, be embodied in many different forms and should not be construed as being limited to the embodiments set forth herein; rather, these embodiments are provided so that this disclosure will be thorough and complete, and will fully convey the concept of the invention to one skilled in the art. In the drawings, the shapes and sizes of elements may be exaggerated for clarity. Like reference numerals in the drawings denote like elements.

FIG. 1 is a cross-sectional view of an example of a monitoring camera 100 according to an embodiment of the present invention. The monitoring camera 100 may receive light 113 and be attached to a structure 112 such as a ceiling. In an embodiment, the monitoring camera 100 includes a base 101, a housing 103, and a mounting unit 110. The base 101 may be installed on the structure 112. A camera module (not illustrated) may be disposed in the housing 103 and may receive light 113 that passes through the housing 103. The housing 103 may be attachable and detachable from the base 101. The base 101 may include a hooking member 102. The hooking member 102 may fixedly attach to the latch 106 of the mounting unit 110 so as to fix the housing 103 to the base 101. A button member 104 may be exposed outside the housing 103 and may be combined with a hinge 104a to the housing 103, and the button member 104 may extend inside the housing 103. A mounting unit 110 may extend from the button 104 to the hooking member 102. Manipulation of the button member 104 may detach the latch 106 from the hooking member 102, and thus may detach the housing 103 from the base 101.

Figure 2:
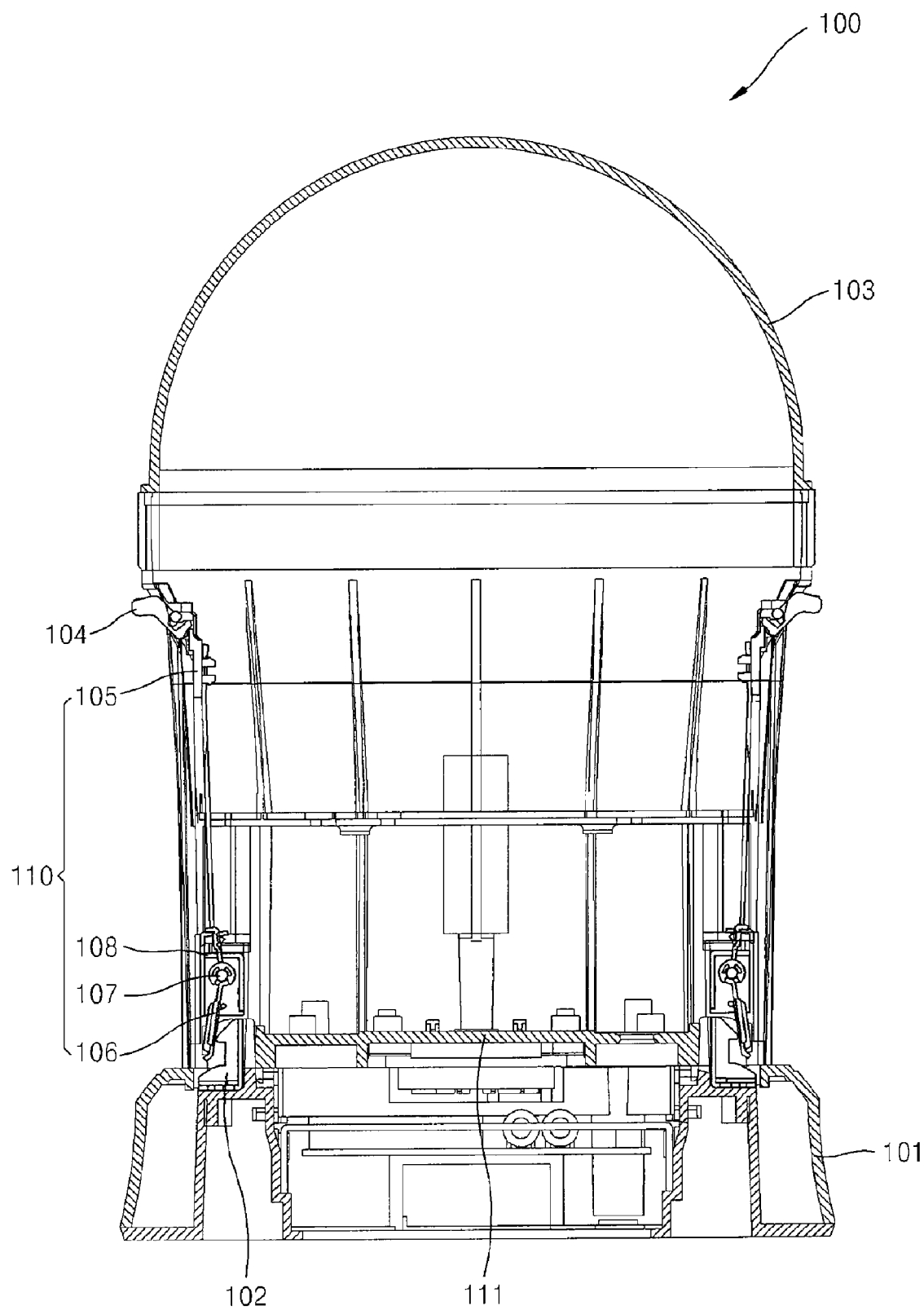
FIG. 2 is a cross-sectional view of an example of a monitoring camera according to an embodiment of the present invention.
Figure 3:
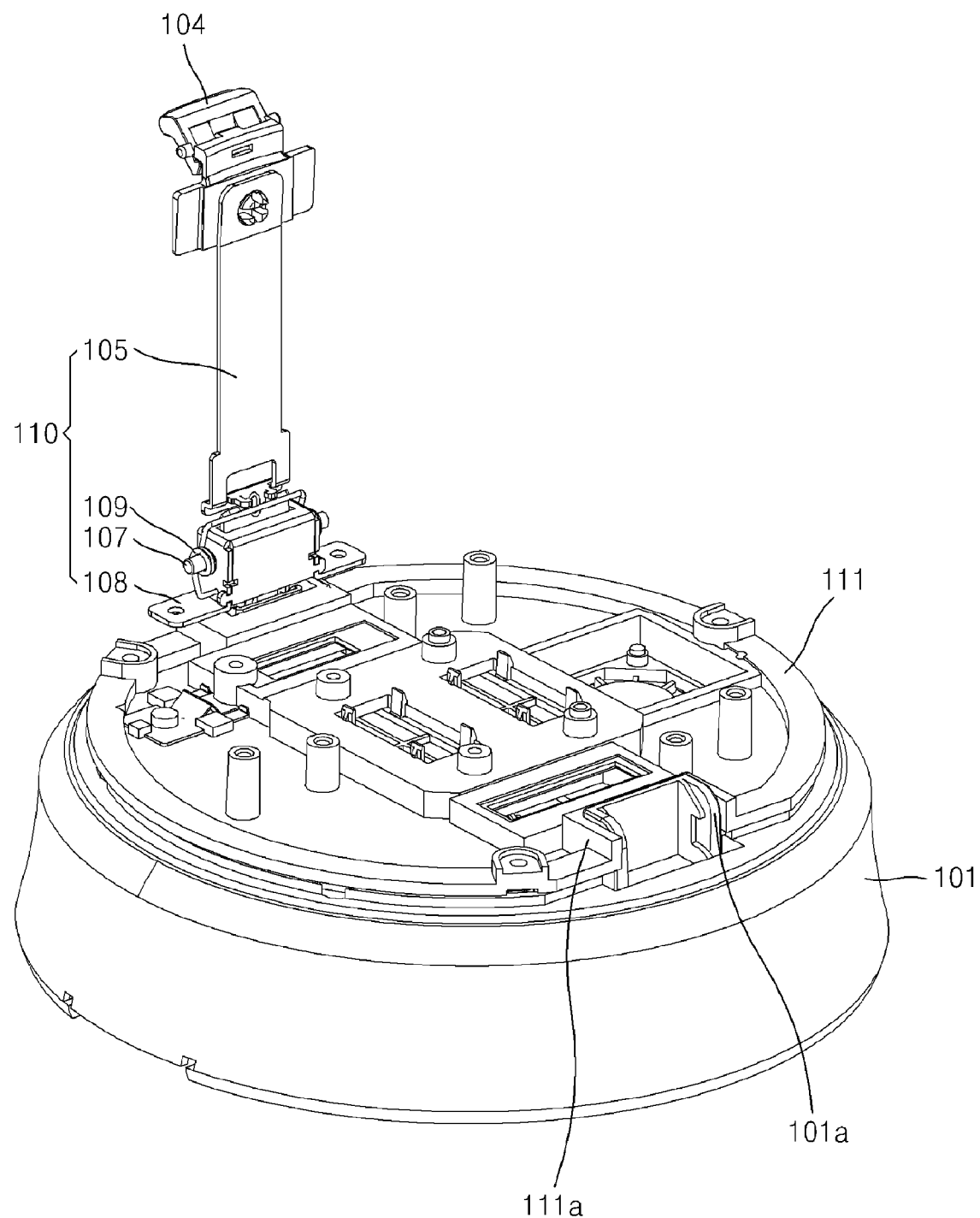
FIG. 3 is a perspective view of an example of a base and a mounting unit of the monitoring camera illustrated in FIG. 1.
Figure 4:
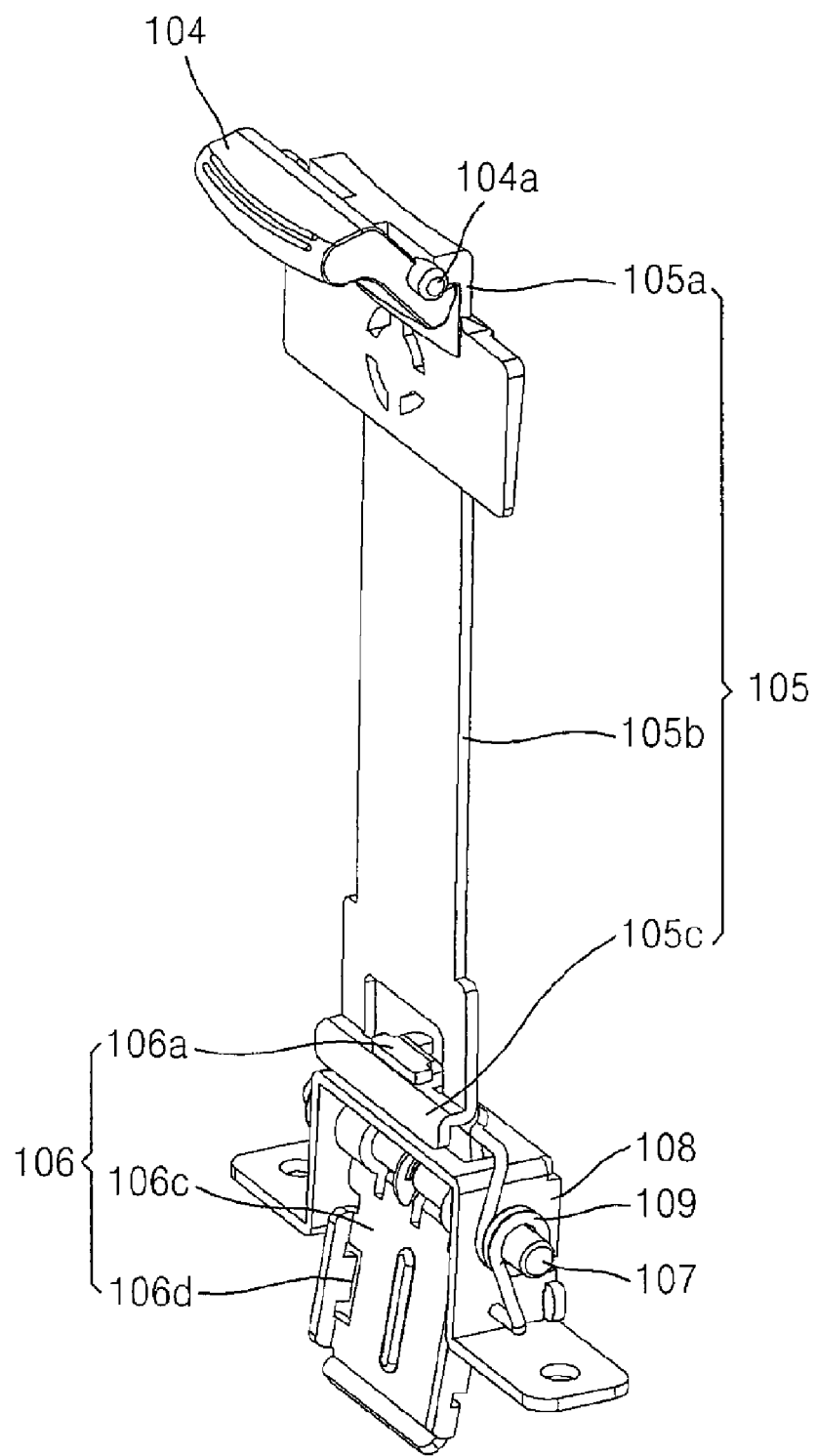
FIG. 4 a perspective view of an example of the mounting unit of the monitoring camera illustrated in FIG. 1.
Figure 5:
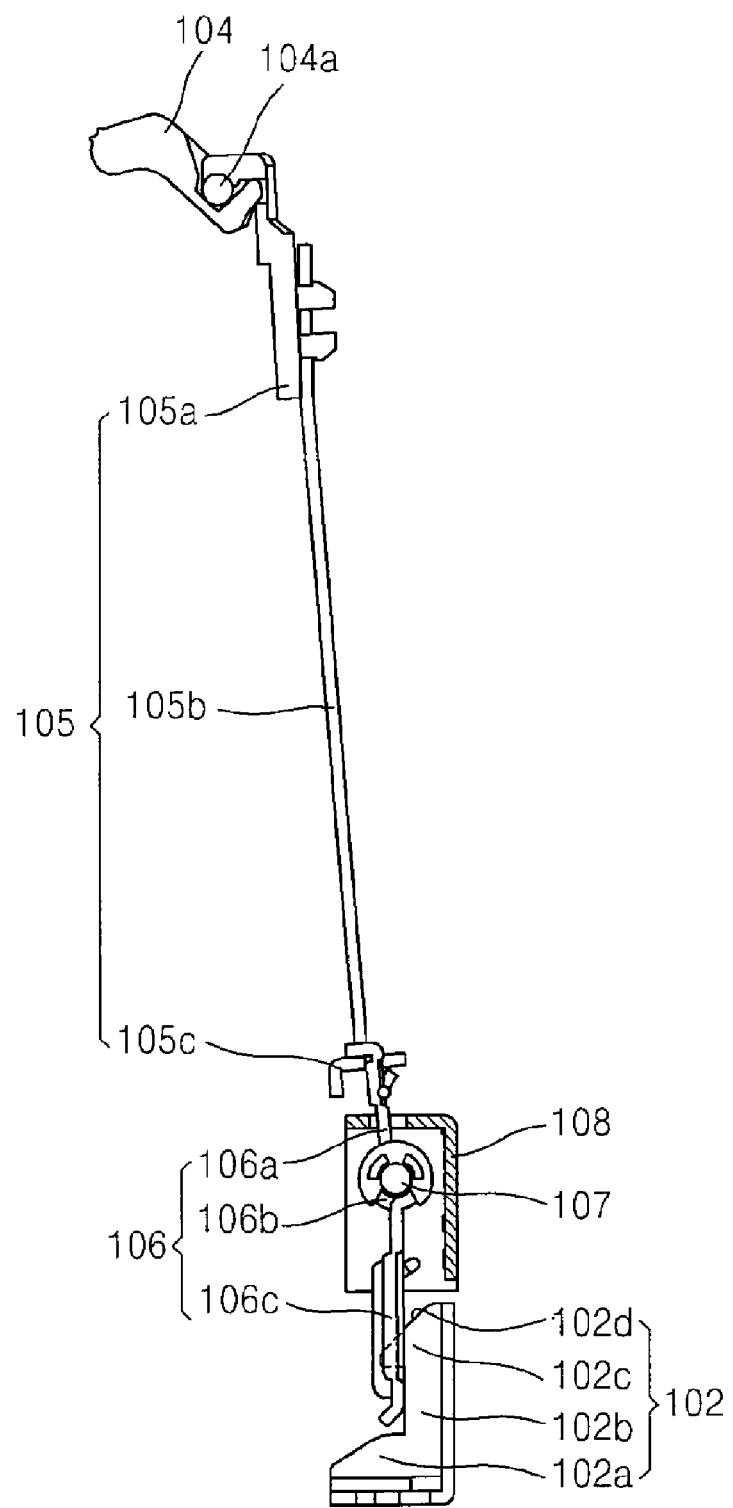
FIG. 5 is a cross-sectional view of an example of the mounting unit and a hooking member of the monitoring camera illustrated in FIG. 1 when the mounting unit is fixedly attached to the hooking member.
Figure 6:
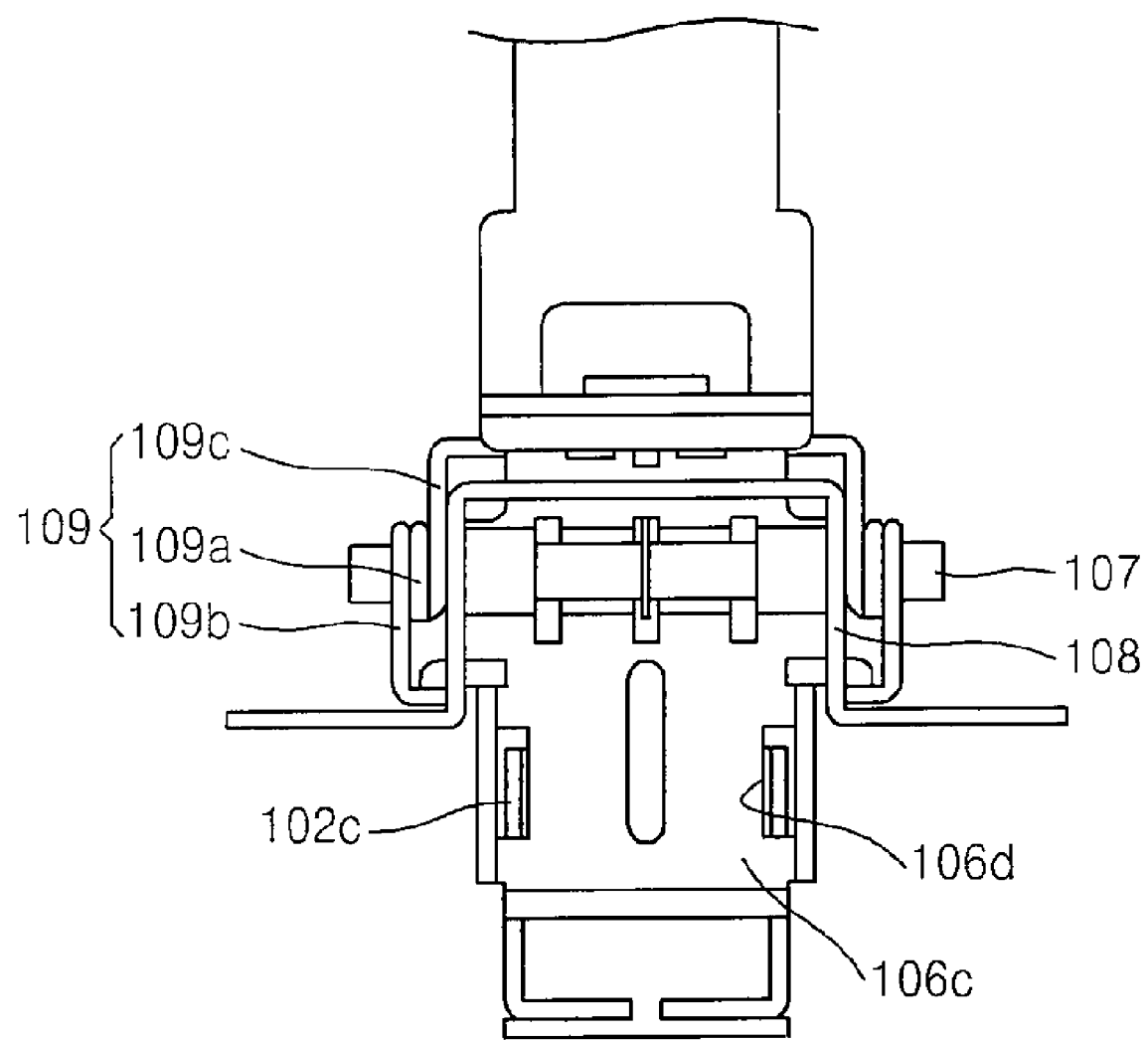
FIG. 6 a front view of an example of the mounting unit and the hooking member of the monitoring camera illustrated in FIG. 1 when the mounting unit is fixedly attached to the hooking member.

FIG. 2 is a cross-sectional view of an example of a monitoring camera 100 according to an embodiment of the present invention. FIG. 3 is an example of a perspective view of a base 101 and a mounting unit 110 of the monitoring camera 100 illustrated in FIG. 2. FIG. 4 is a perspective view of an example of the mounting unit 110 of the monitoring camera 100 illustrated in FIG. 1. FIGS. 5 and 6 respectively are a cross-sectional view and a front view of examples of the mounting unit 110 and a hooking member 102 of the monitoring camera 100 illustrated in FIG. 2 when the mounting unit 110 is fixedly attached to the hooking member 102.

Referring to FIGS. 2 and 3, in an embodiment, the monitoring camera 100 includes the base 101, the hooking member 102, a housing 103, a button member 104, and the mounting unit 110.

The base 101 may be fixed and installed on a structure such as a ceiling. One surface of the base 101 may be fixed and installed on the structure and the housing 103 may be disposed on the other surface of the base 101. Also, the hooking member 102 is disposed on the other surface of the base 101, on which the housing 103 is disposed.

The base 101 may include an accommodating unit 101a providing a space where the hooking member 102 is accommodated. One side of the accommodating unit 101a is open so as to allow a latch 106 to fixedly attach to the hooking member 102. In an embodiment, the accommodating unit 101a surrounds sides and a rear surface of the hooking member 102 and front and top surfaces of the accommodating unit 101a.

The hooking member 102 may fixedly attach to the latch 106 of the mounting unit 110 so as to fix the housing 103 to the base 101.

Referring to FIG. 5, in an embodiment, the hooking member 102 may include a bottom unit 102a, a pillar unit 102b, and a protrusion unit 102c. The bottom unit 102a is disposed on the other surface of the base 101. The pillar unit 102b extends from the bottom unit 102a in a direction toward the housing 103. The protrusion unit 102c extends from one end of the pillar unit 102b in a direction toward the side of the housing 103.

In an embodiment, the protrusion unit 102c may fixedly attach to the latch 106. The protrusion unit 102c may have a hook shape. The protrusion unit 102c may have a slope 102d inclining toward the housing 103. In an embodiment, when the housing 103 is mounted on the base 101, the latch 106 slides along the slope 102d of the protrusion unit 102c and fixedly attaches to the protrusion unit 102c. Thus, the housing 103 may be easily mounted on the base 101.

Referring back to FIGS. 2 and 3, a camera module (not shown) is disposed in the housing 103. The top portion of the housing 103 may be formed in a dome shape. A bracket 111 may be disposed on the base 101.

In an embodiment, an accommodating indentation 111a may be formed in a side of the bracket 111 so as to correspond to the shape of the hooking member 102. The accommodating groove 111a may be formed so as to correspond to the external shape of the accommodating unit 101a.

In an embodiment, when the base 101 is viewed from above, the accommodating unit 101a has a square bracket shape and the bracket 111 has an indentation toward the center of the bracket 111 with a square bracket shape. In an embodiment, the accommodating indentation 111a may accommodate the accommodating unit 101a. The accommodating indentation 111a may have various shapes, in addition to the square bracket shape, that may be determined according to the shape of the accommodating unit 101a.

In an embodiment, the accommodating indentation 111a is formed adjacent to the side of the bracket 110 that is disposed in the bottom portion of the housing 103 so that the housing 103 may be firmly fixed with the base 101. This may have the advantage that the effects of external vibration on the camera module disposed in the housing 103 may be reduced.

In an embodiment, one end of the button member 104 is exposed outside the housing 103 and the other end of the button member 104 is included in the housing 103 so as to be hinge-combined with the housing 103. In an example illustrated in FIG. 4, the button member 104 can be hinge-combined with the housing 103 by using a hinge pin 104a. In an embodiment, if the one end of the button member 104 exposed outside the housing 103 is pushed in a direction toward the base 101, the button member 104 rotates about the hinge pin 104a, and thus the other end of the button member 104 moves upward.

In an embodiment, the mounting unit 110 is fixedly attached to the hooking member 102 to attach the housing 103 to the base 101 and detached from the hooking member 102 due to detach the housing 103 from the base 101. In an embodiment, the mounting unit 110 includes an extension member 105 of which one end is engaged with the other end of the button member 104, and the other end is engaged with the latch 106 that fixedly attaches to the hooking member 102.

Referring to the examples illustrated in FIGS. 4 and 5, in an embodiment, the extension member 105 may include a body unit 105b and first and second connection units 105a and 105c that are disposed respectively on ends of the body unit 105b. The first connection unit 105a may be disposed on one end of the body unit 105b and an end of the first connection unit 105a is curved in a direction toward outside the housing 103. The first connection unit 105a is engaged with the other end of the button member 104. Although the first connection unit 105a and the body unit 105b are separately formed and are connected to each other as shown in the example of FIG. 4, the present invention is not limited thereto, and thus, the first connection unit 105a may be integrally formed with the body unit 105b. In an embodiment, one end of the latch 106 is engaged with the second connection unit 105c of the extension member 105 and the other end of the latch 106 is fixedly attached to the hooking member 102. The latch 106 may be hinge-combined with the housing 103. In an embodiment, the latch 106 is hinge-combined with the housing 103 by using a fixing bracket 108 and a hinge pin 107. In an embodiment, the hinge pin 107 combines a hinge knuckle (not shown) of the fixing bracket 108 and a combining hole 106b of the latch 106. The latch 106 may include first and second extension units 106a and 106c that extend from the combining hole 106b in different directions. In an embodiment, the first extension unit 106a is inclined with respect to the second extension unit 106c. In an embodiment, the second extension unit 106c includes a fixing indentation 106d so as to fixedly attach to the protrusion unit 102c of the hooking member 102.

The mounting unit 110 may further include an elastic member 109 with elasticity so as to maintain the latch 106 fixedly attached to the hooking member 102. The elastic member 109 may be a torsion spring. As the example of FIG. 5 illustrates, the elastic member 109 includes a coil unit 109a, a first straight unit 109b extending from one end of the coil unit 109a, and a second straight unit 109c extending from the other end of the coil unit 109a. In an embodiment, the coil unit 109a fits around the hinge pin 107; the first straight unit 109b is fixed with the fixing bracket 108; and the second straight unit 109c is disposed on the first extension unit 106a of the latch 106. The elastic member 109 provides elasticity with respect to the second extension unit 106c of the latch 106 toward the hooking member 102. Thus, in an embodiment, when the latch 106 is fixedly attached to the hooking member 102, the elastic member 109 may maintain the latch 106 fixedly attached to the hooking member 102.

Figure 7:
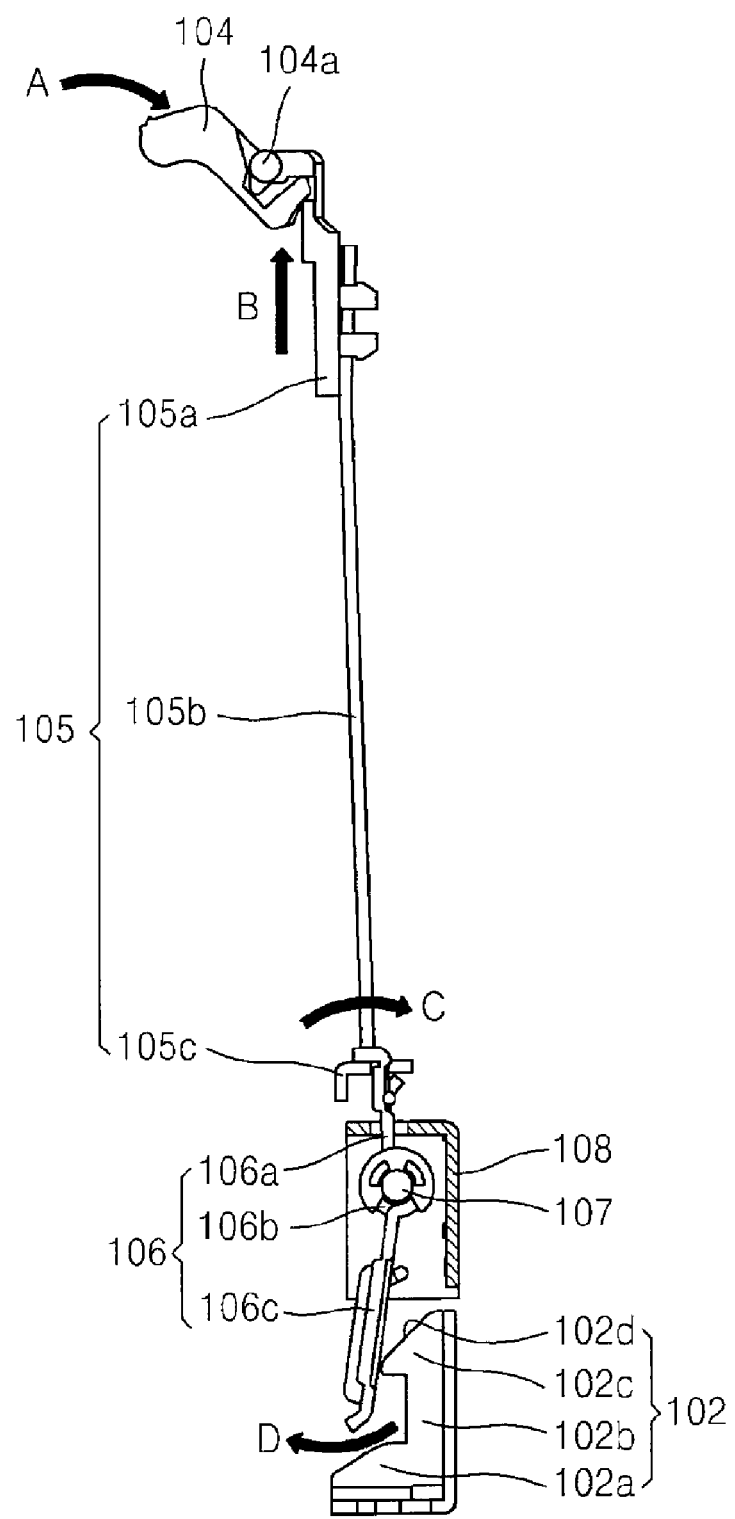
FIG. 7 is a cross-sectional view of an example of the mounting unit and the hooking member of the monitoring camera illustrated in FIG. 1 when the mounting unit is detached from the hooking member.

FIG. 7 is a cross-sectional view of examples of the mounting unit 110 and the hooking member 102 of the monitoring camera 100 illustrated in FIG. 2 when the mounting unit 110 is detached from the hooking member 102.

Embodiments of attaching and detaching the housing 103 to and from the base 101 will now be described with reference to FIGS. 5 through 7.

In FIGS. 5 through 7, for simplicity, the base 101 and the housing 103 are not illustrated, and only examples of the button member 104, the mounting unit 110, and the hooking member 102 are illustrated.

Referring to FIGS. 5 through 7, in an embodiment, if the housing 103 is attached to the base 101 by being pushed on the base 101, the fixing indentation 106d that is formed in the second extension unit 106c of the latch 106 is fixedly attached to the protrusion unit 102c of the hooking member 102 so that the housing 103 is attached to the base 101. In an embodiment, the protrusion unit 102c of the hooking member 102 has the slope 102d inclining toward the housing 103, and thus the second extension unit 106c of the latch 106 slides along the slope 102d such that the protrusion unit 102c is fixedly attached to the fixing indentation 106d. In an embodiment, the elastic member 109 provides elasticity with respect to the second extension unit 106c toward the hooking member 102 so as to maintain the latch 106 fixedly attached to the hooking member 102.

In an embodiment, when the housing 103 is detached from the base 101, if the one end of the button member 104 is pushed in a direction A toward the base 101, the button member 104 rotates about the hinge pin 104a, and thus the other end of the button member 104 moves in a direction B opposite the direction A. In an embodiment, the extension member 105 that is engaged with the other end of the button member 104 also moves in the direction B. In an embodiment, since the first extension unit 106a of the latch 106 is engaged with the second connection unit 105c of the extension member 105 and the latch 106 is hinge-combined with the fixing bracket 108, as the extension member 105 moves in the direction B, the first extension unit 106a of the latch 106 rotates in a direction C about the hinge pin 107, and the second extension unit 106c of the latch 106 rotates in a direction D. Accordingly, the latch 106 is detached from the hooking member 102. As such, in an embodiment, if the button member 104 is pushed so that the latch 106 detaches from the hooking member 102, the housing 103 may be easily detached from the base 101.

Embodiments may have the advantage that the housing 103 may be easily detached in locations with limited space by manipulating the button member 104 that is disposed near the housing 103. As described above, embodiments of a monitoring camera may have the advantage that a housing may be easily detached from a base by simply manipulating a button member and may be easily fixed on the base by pushing the housing onto the base.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A monitoring camera comprising:
a base which is fixable and installable on a structure;
a housing which is attachable to and detachable from the base;
a hooking member which is disposed on the base so as to fix the housing with the base;
a button member of which one end is exposed outside the housing and the other end is hinge-combinable with the housing and is disposed in the housing; and
at least one mounting unit which is fixedly attachable to the hooking member so as to attach the housing to the base, and is detachable from the hooking member due to a manipulation of the button member so as to detach the housing from the base, wherein the at least one mounting unit is disposed inside the housing.

2. The monitoring camera of claim 1, wherein the mounting unit comprises:
an extension member of which one end is connected to the other end of the button member; and
a latch which is connected to the other end of the extension member and is fixedly attachable to the hooking member, wherein the extension member extends a distance between the button member and the latch.

3. The monitoring camera of claim 2, wherein the mounting unit further comprises a fixing bracket which is disposed on the housing and is hinge-combinable with the latch.

4. The monitoring camera of claim 3, wherein the mounting unit further comprises an elastic member which is disposed on a hinge pin that hinge-combines the latch and the fixing bracket, and has elasticity so as to maintain the latch fixedly attached to the hooking member.

5. The monitoring camera of claim 4, wherein the elastic member is a torsion spring.

6. The monitoring camera of claim 4, wherein the elastic member comprises a coil unit, a first straight unit which extends from one end of the coil unit, and a second straight unit which extends from the other end of the coil unit, and
wherein the coil unit fits around the hinge pin, the first straight unit is fixed with the fixing bracket, and the second straight unit is disposed on an upper portion of the latch.

7. The monitoring camera of claim 2, wherein the hooking member comprises:

a bottom unit which is disposed on the base;

a pillar unit which extends from the bottom unit in a direction toward the housing; and a protrusion unit which protrudes from one end of the pillar unit in a direction toward a side of the housing.

8. The monitoring camera of claim 7, wherein the latch comprises a fixing indentation corresponding to the protrusion unit so as to engage with the protrusion unit.

9. The monitoring camera of claim 7, wherein the protrusion unit comprises a slope which is inclined toward the housing.

10. The monitoring camera of claim 7, wherein the base comprises an accommodating unit which provides a space where the hooking member is accommodated, and wherein one side of the accommodating unit is open so as to allow the latch to fixedly attach to the hooking member.

11. The monitoring camera of claim 7, further comprising a bracket which is disposed between the housing and the base, wherein an accommodating indentation is formed in a side of the bracket so as to correspond to the hooking member.

12. The monitoring camera of claim 1, wherein the mounting unit comprises:

an extension member of which one end is connected to the other end of the button member and wherein the extension member is disposed within the housing; and a latch which is hinge-connected to the other end of the extension member and is fixedly attachable to the hooking member.

13. A monitoring camera comprising:

a base which is fixable and installable on a structure;

a housing which is attachable to and detachable from the base;

a hooking member which is disposed on the base so as to fix the housing with the base;

a button member of which one end is exposed outside the housing and the other end is hinge-combinable with the housing and is disposed in the housing; and at least one mounting unit which is fixedly attachable to the hooking member so as to attach the housing the base, and is detachable from the hooking member due to a manipulation of the button member so as to detach the housing from the base, wherein the mounting unit comprises:

an extension member of which one end is connected to the other end of the button member;

a latch which is connected to the other end of the extension member and is fixedly attachable to the hooking member; and a fixing bracket which is disposed on the housing and is hinge-combinable with the latch.

14. A monitoring camera comprising:

a base which is fixable and installable on a structure;

a housing which is attachable to and detachable from the base;

a hooking member which is disposed on the base so as to fix the housing with the base;

a button member of which one end is exposed outside the housing and the other end is hinge-combinable with the housing and is disposed in the housing; and at least one mounting unit which is fixedly attachable to the hooking member so as to attach the housing to the base, and is detachable from the hooking member due to an act of pushing the button member in a substantially perpendicular direction to a bottom surface of the base so as to detach the housing from the base.

\* \* \* \* \*